Patented Nov. 28, 1922.

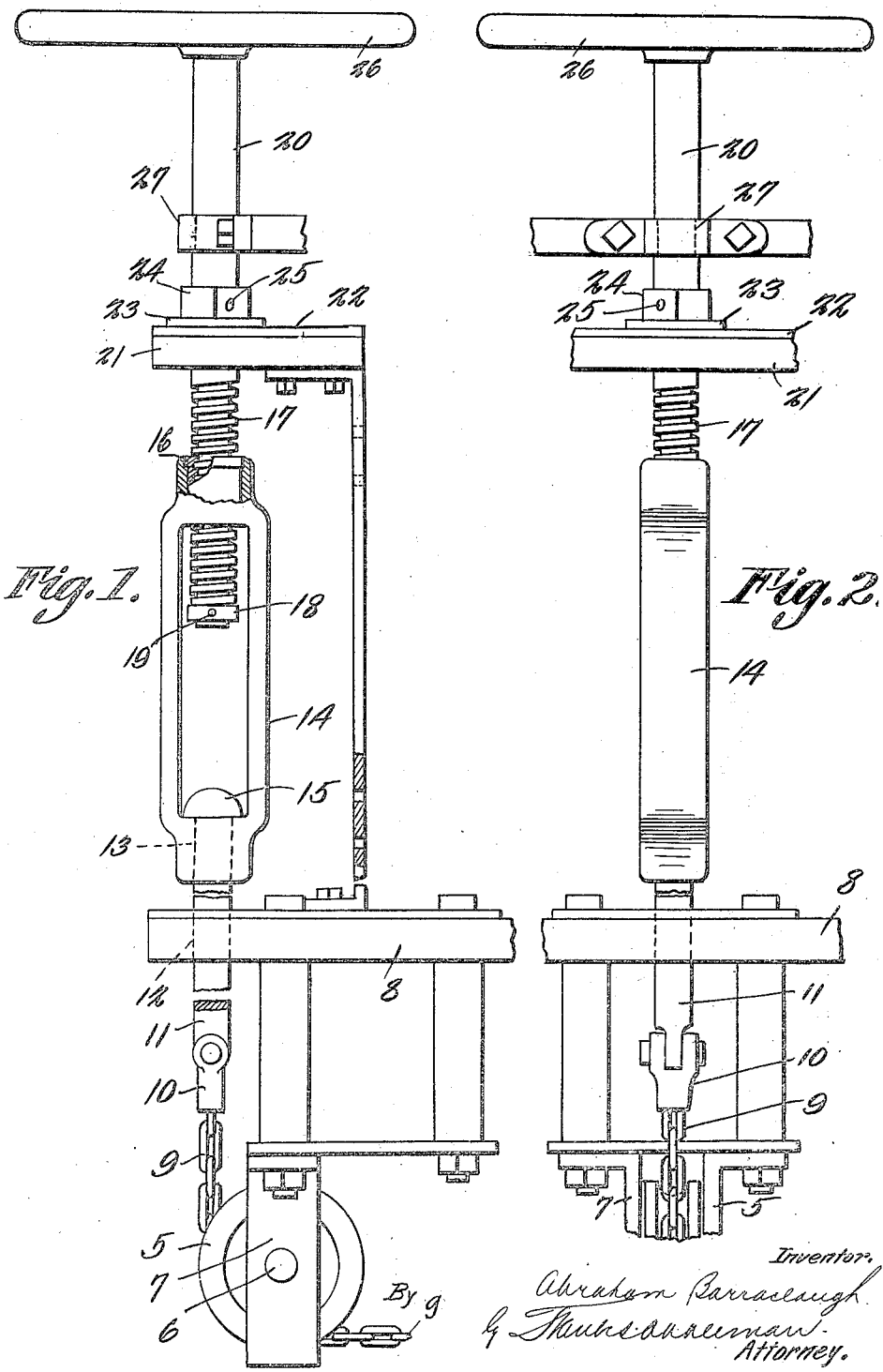

1,436,636

UNITED STATES PATENT OFFICE.

ABRAHAM BARRACLOUGH, OF GALLUP, NEW MEXICO.

HAND BRAKE FOR RAILROAD CARS.

Application filed December 31, 1919. Serial No. 348,650.

*To all whom it may concern:*

Be it known that I, ABRAHAM BARRACLOUGH, a citizen of the United States of America, and resident of Gallup, in the county of McKinley and State of New Mexico, have invented certain new and useful Improvements in Hand Brakes for Railroad Cars, of which the following is a specification.

This invention relates to brake operating mechanism for railway cars and has for its object the provision of novel means whereby a hand brake may be employed on railway cars without the employment of ratchet wheels and pawls, the said invention having for its further object the provision of novel means whereby the brakes may be held at different positions of adjustment without liability of moving accidentally under impact of the cars or other strains.

A further object of my invention is to provide brake operating mechanism of such construction that the parts thereof may be readily assembled for attachment to a car and when attached thereto the brake bar will be maintained in a predetermined position and held against vertical movement.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation showing a brake operating mechanism embodying the invention; and Figure 2 illustrates a similar view at right angles to that shown in Figure 1.

In these drawings 5 denotes a sheave pulley which may be rotatably mounted on a pintle or shaft 6 supported by a bracket 7 located on the under frame 8 of a car, but these parts of the device may be variously modified to suit particular requirements and they are not described more in detail. It is only necessary that the sheave pulley shall be so placed in operative relation to the brake beam as to permit the chain 9 which runs over the sheave pulley to be connected to the brake beam so that it will pull the brake shoes against the wheels of the car.

One end of the chain 9 is connected to the reduced end of an extension member 11 by a shackle 10, the other end of the chain being fastened to a brake beam of a car, in the usual way, after being guided by a sheave 6. The member 11 is non-circular, in cross section and its lower end is reduced and apertured to receive a rivet or bolt which connects the shackle to the member 11. The shackle not only serves to connect the chain to the slidable member 11 but also serves to restrict upward movement of the member by engagement with the underside of the frame 8 of the car about the aperture 12 which conforms to the shape of the member 11, the upper portion of the shackle being wider than the width of the aperture 12. The member 11 is shaped to provide a head 15, and said member in form is similar to a bolt-blank, except that it is not circular in cross section, and the length of this member is the factor that determines the position of the hand wheel on the brake bar as to height relative to distance above the platform or top of the car, and in manufacturing the length of this member is the only element that is varied. The extension member is associated with a loop or link-like member 14 one end thereof having an aperture 13 shaped to conform with the non-circular shape of the non-rotative member 11, and the member 11 holds the member 14 against turning and also prevents the brake chain being twisted. The lower portion of the loop member about the aperture 13 and between the side bars of such member is formed to provide shoulders that are engaged by the head 15 of the member 11.

The upper end of the loop or link-like member 14 has an aperture with a non-corrosive bushing 16 threaded to engage the threads of the screw 17, the said screw extending through the end of the loop 14 and being supplied with a collar 18 which is secured on the lower end of the screw by a fastening 19 such as a pin.

The pitch and character of the threads 17 on the brake bar 20, and of the bushing 16 are such that longitudinal stress will not result in turning the brake bar under longitudinal stress and thus renders unnecessary the use of locking means to prevent rotation of the brake-bar.

The upper portion of the brake bar 20 has attached thereto, in any appropriate manner a hand wheel 26, and below the same the brake bar may have a circular recess, is engaged by a bearing 27 that is attached to the car, and below the bracket and bearing the brake bar has fixedly attached thereto, as by means of a pin 25, a collar 24 having a flange 23 that bears upon a plate 22 attached to the upper face of a projecting portion of the car. By the means shown the brake bar will be maintained in alinement with the member 11, it is held against longitudinal movement and is non-rotatable unless power is applied to its hand wheel.

From an inspection of the drawing and from the foregoing description, it will be apparent that when the brake wheel 26 is rotated in one direction or the other, it will serve to raise or to lower the link like frame or loop according to the direction of rotation and that the vertical movement thereof will then be communicated to the chain for pulling or releasing the brake beam and that the presence of the non-corrosive bushing will insure free movement of the screw with relation to the loop or frame, regardless of weather conditions.

The drawings show a bar the ends of which are bent at right angles and provided with apertures for attachment to a car, and in practice the guide wheel 5 for the brake chain may be supported in any appropriate manner, and other details of construction and incident to the assemblage of the parts and of their application for use may be varied to accord with the car structure to which they are attached, the scope of my invention being set forth in the claim.

I claim—

In manually operated brake mechanism for cars, a support attached to the car body for maintaining a brake bar in rotative engagement therewith and against longitudinal movement, a brake bar having a threaded portion below the support, a link like loop having at one end a threaded aperture for engagement with the threaded portion of the brake bar and at the other end a non-circular aperture, a headed non-circular extension member associated with the loop and depending therefrom, a support having a non-circular aperture therethrough, means for connecting the lower end of the extension member with a brake beam, the parts being organized so that when the brake bar is turned the loop and the extension member thereof will be reciprocated without longitudinal movement of the brake bar.

ABRAHAM BARRACLOUGH.